Aug. 10, 1965          C. STROHMEYER, JR          3,199,494
     DEVICES FOR IMPROVING OPERATING FLEXIBILITY OF STEAM-ELECTRIC
                           GENERATING PLANTS
Filed July 15 1964                              5 Sheets-Sheet 1

INVENTOR.
CHARLES STROHMEYER, Jr.
BY
*William J. Ruano*
His ATTORNEY

Aug. 10, 1965  C. STROHMEYER, JR  3,199,494
DEVICES FOR IMPROVING OPERATING FLEXIBILITY OF STEAM-ELECTRIC
GENERATING PLANTS
Filed July 15 1964  5 Sheets-Sheet 2

INVENTOR.
CHARLES STROHMEYER, Jr.
BY

HIS ATTORNEY

Aug. 10, 1965 C. STROHMEYER, JR 3,199,494
DEVICES FOR IMPROVING OPERATING FLEXIBILITY OF STEAM-ELECTRIC
GENERATING PLANTS
Filed July 15 1964 5 Sheets-Sheet 3

INVENTOR.
CHARLES STROHMEYER, Jr.
BY
*William J Ruano*
his ATTORNEY

Aug. 10, 1965     C. STROHMEYER, JR     3,199,494
DEVICES FOR IMPROVING OPERATING FLEXIBILITY OF STEAM-ELECTRIC
GENERATING PLANTS
Filed July 15, 1964     5 Sheets-Sheet 4

INVENTOR.
CHARLES STROHMEYER, Jr.
BY
*William J. Ruano*
his ATTORNEY

Aug. 10, 1965 C. STROHMEYER, JR 3,199,494
DEVICES FOR IMPROVING OPERATING FLEXIBILITY OF STEAM-ELECTRIC
GENERATING PLANTS
Filed July 15 1964 5 Sheets-Sheet 5

INVENTOR.
CHARLES STROHMEYER, Jr
BY
*William J. Ruano*
HIS ATTORNEY

United States Patent Office 3,199,494
Patented Aug. 10, 1965

3,199,494
DEVICES FOR IMPROVING OPERATING FLEXIBILITY OF STEAM-ELECTRIC GENERATING PLANTS
Charles Strohmeyer, Jr., Wyomissing, Pa., assignor to Gilbert Associates, Inc., Reading, Pa.
Filed July 15, 1964, Ser. No. 383,559
5 Claims. (Cl. 122—1)

This application is a continuation-in-part of U.S. application Serial No. 162,603, filed December 27, 1961, now abandoned.

This invention relates to devices and systems for improving the operating flexibility of steam electric generating units including a steam generator, turbine generator and auxiliary equipment.

An object of the invention is to provide a novel apparatus and a system which will reduce unit start-up time and costs as well as to provide the steam generator with capability to vary superheater outlet steam temperature to control the rate of metal temperature rise or fall within the turbine during start-up and shut-down, respectively, in a way which will minimize water impurities from entering the superheater, downstream piping and turbine driver.

A more specific object of the invention is to provide a novel auxiliary heat exchanger for heating flow in an intermediate section of the water-steam circuit of a steam generator and which auxiliary heat exchanger heat input is from a source separate from the common source to the water-steam flow circuit, upstream and downstreams of the said auxiliary heat exchanger. The said auxiliary heat exchanger may be bypassed when its operation is not required.

A further specific object of the invention is to provide a novel system for controlling the pressure of the heated effluent flow from the auxiliary heat exchanger, described in the preceding paragraph, before the flow enters the downstream superheater circuits of the steam generator; thus the fluid pressure in the downstream superheater can be lowered artificially to any desired level independently of the fluid pressure maintained upstream of the auxiliary heat exchanger, the upstream to downstream bypass around the auxiliary heat exchanger being shutoff or also controlling flow to accomplish the pressure reduction.

A still further specific object of the invention is to employ the above objectives, individually, or in combination with a system for recirculating flow through a circuit from an intermediate section of a supercritical pressure steam generator water-steam flow path back to the water inlet connection or other point upstream from the recirculation take-off point—recirculation being accomplished by means of a pump.

A still further specific object of the invention is to provide a novel system for extracting water-steam cycle flow upstream of the auxiliary heat exchanger which may be discharged to a receiver operating at lower pressure in the subcritical range for the purpose of separating steam and water, which steam flow can be used for feed-water cycle heating or plant auxiliary drives or wasted to a heat sump, and which water drains can be discharged to a heat sump for cooling before passing through purification equipment subsequent to being returned to the steam generator feedwater inlet connection.

A still further specific object of the invention is to provide a novel system using the auxiliary heat exchanger for supplying low subcritical pressure steam to the steam generator feedwater heating cycle or plant auxiliary drives.

A still further specific object of the invention is to provide a novel system for a recirculation type supercritical pressure steam generator in conjunction with the auxiliary heat exchanger whereby the inlet water-steam cycle flow may be operated at low temperature during start-up, pressure being sufficient to prevent two phase mixtures from forming in the pumped recirculation circuit, low temperatures in this pumped recirculation circuit minimizing deposit formations on the tube walls when the flow contains impurities, whereby part of the flow may be drawn off the recirculation circuit upstream of the auxiliary heat exchanger for discharge to a heat sump for cooling and subsequent water purification, and whereby part of the low temperature intermediate flow may be passed through the auxiliary heat exchanger to raise its enthalpy before pressure reduction and discharge to the downstream superheater, so that low pressure subcritical superheated steam may be supplied to a turbine driver downstream of the superheater outlet; the downstream superheater being isolated from the upstream recirculation circuit except through the auxiliary heat exchanger; thus the steam generator and turbine driver may be started together prior to the time that cycle water purification is completed.

A still further specific object of the invention is to provide a novel system for maintaining supercritical pressure in the inlet recirculation section of the steam generator after the main furnace fires have been extinguished by means of isolating the water-steam flow circuits downstream from the auxiliary heat exchanger from the upstream circuits including the auxiliary heat exchanger, and mixing heated effluent from the auxiliary heat exchanger with the upstream recirculation flow, thus eliminating the need to fire the main furnace.

A still further specific object of the invention is to provide a novel system for using the auxiliary heat exchanger for the purpose of producing low pressure steam for use in the feedwater heating cycle or for driving plant auxiliary equipment during start-up prior to the time flow is established in the steam generator water-steam flow circuits and the lighting off of the steam generator main furnace, the auxiliary heat exchanger being isolated from the steam generator water-steam flow circuits at this time.

A still further specific object of the invention is to provide a novel system for a recirculation type supercritical pressure steam generator having a pressure controlling and shutoff valve system between the feedwater inlet and superheater steam outlet, an upstream recirculation loop through the absorption circuits most intimately exposed to radiant heat, a connection from the recirculation loop to a steam and water separator, whereby there is means for reducing pressure between the two points, and whereby steam separated in the steam and water separator may be returned to the superheater downstream of the pressure controlling and shutoff valve system.

Other objects and advantages of the invention will become more apparent from a study of the following description taken with the accompanying drawings wherein:

FIGS. 1a and 1b are schematic diagrams of the auxiliary heat exchanger connections to the internal circuit of the steam generator between the feedwater inlet and superheater steam outlet and FIGURES 1c, 1d and 1e are modifications of FIGURE 1a.

The individual identifying numbers or symbols in all figures relate to the same devices.

*General description of present invention*

Generally stated, there are separate but interrelated control elements involved in the present invention. These elements may be used in various combinations.

Figure 1A:
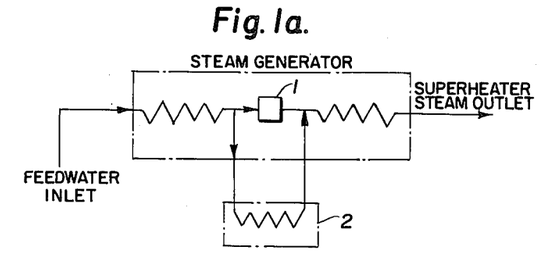

FIG. 1a is a schematic diagram showing the water-steam flow circuit of the steam generator. Heat input facilities, not shown, consist of a main source for the steam generator water-steam flow circuit, 1a and 1b, such as a combustion furnace or other heat producer, and an auxiliary source which is separate from the heat flow path of the main source. The auxiliary source supplies heat to the auxiliary heat exchanger 2, which heats flow from an intermediate portion of the steam generator water-steam circuit. The auxiliary heat source discharge flow may be completely separate from the main heat source flow, or it may be joined into a common flow stream with the main heat source at some point downstream of the auxiliary heat generation point.

In the case where the main and auxiliary heat sources are both combustion furnaces, radiant heat from the flame preferably shall not project from one furnace to the other furnace.

The auxiliary heat exchanger is to be used during startup of the steam generator itself, or in conjunction with the startup of an associated turbine driver receiving steam from the superheater outlet. Sudden loss of outlet steam flow may shut down the steam generator combustion system and heat input to the water-steam circuits from the auxiliary heat exchanger will minimize pressure decay when restarting the steam generator. Also while shutting down as well as during a steam generator outage, the auxiliary heat exchanger may be used to sustain temperature and pressure in the water-steam ciriuits on the upstream side to keep the steam generator in a ready state for easy starting. These features are described below.

In FIG. 1a, the feedwater enters the steam generator and flows through absorption circuits or conduits 1a and 1b, taking heat from the main input source. In the through circuit between the feedwater inlet and superheater steam outlet there is a pressure controlling and/or shutoff valve system 1. The arrows indicate direction of flow. The 1a upstream of system 1 is connected to the inlet of auxiliary heat exchanger 2 through circuit 1c. The auxiliary heat exchanger 2 discharges to the absorption circuit 1b downstream of system 1 through circuit 1d. The flow continues through circuit 1b to the superheater outlet steam connection. The arrangement shown is applicable for both a subcritical and supercritical pressure steam generator. During startup when flow passes through the auxiliary heat exchanger 2, it is preferable that system 1 be closed. The heat input to auxiliary heat exchanger 2 raises the enthalpy of the fluid to the downstream circuits. The enthalpy of the fluid upstream of the auxiliary heat exchanger may be maintained sufficiently low so that contamination in the fluid will not deposit on the tube walls. Deposit formations on the tube walls from the presence of iron in the feedwater increase rapidly above 500° F. As the fluid flows through the auxiliary heat exchanger 2 it is increased in temperature so that deposit formations will primarily be limited to this unit. Tube wall deposit formations in the circuits 1a and 1b upstream and downstream of the auxiliary heat exchanger 2 will be minimized. Where flow through the auxiliary heat exchanger 2 is mainly limited to start-up and shutdown periods, contamination will be kept out of the normal operating flow circuits 1a and 1b to the maximum extent. Isolation of the auxiliary heat exchanger 2 will permit flushing of the auxiliary heat exchanger 2 or other cleaning of this unit while the steam generator is in normal operation or the unit is shutdown. Thus deposit build-up in the auxiliary heat exchanger 2 can be controlled.

The flow through auxiliary heat exchanger 2 will be small during startup when the feedwater contains impurities. Therefore, the amount of feedwater impurities entering the auxiliary heat exchanger 2 will be small compared with total cycle impurities, the most part of which will be disposed of by other means at safe temperatures, as described below.

During normal operation, system 1 is in the open position and can be considered as an auxiliary heat exchanger 2 bypass.

Figure 1B:
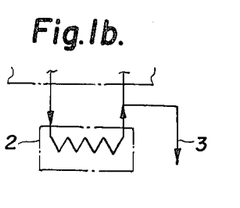
Figure 1C:
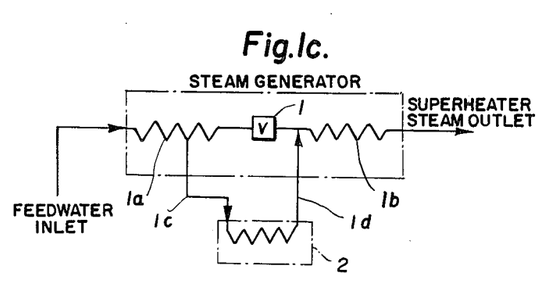
Figure 1D:
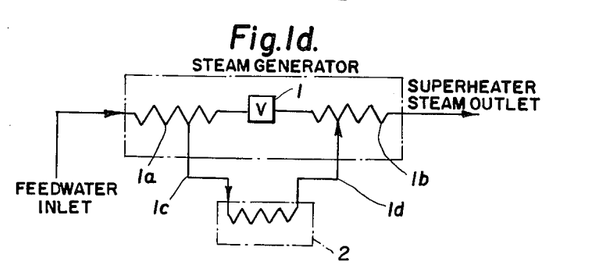
Figure 1E:
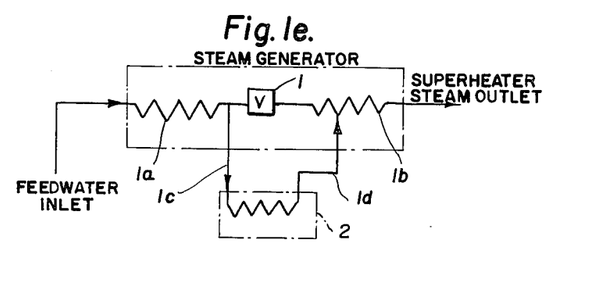

FIGURES 1c, 1d and 1e are alternate arrangements of FIGURE 1a.

Pressure controlling and/or shutoff valve system 1 is designed so that it can reduce the downstream pressure to any desired level when compared with a higher upstream pressure to satisfy the pressure controlling requirement and will also provide isolation of the upstream connection from the downstream connection to satisfy the shutoff requirement. It is preferable that the pressure drop through the system be as low as practical when the system is in the open position during normal operation. It should be remembered that steam generator flow circuits can be designed in many patterns having parallel flow paths. System 1 recognizes the possibility of multiple parallel circuits and many include known arrangements of valves in parallel or series to accomplish the said functions of system 1 as they relate to conditions in the steam generator flow circuits upstream and downstream of system 1. The same philosophy applies to the use of the word "system" in conjunction with valves used for other purposes in this specification.

FIGURE 1b shows a bypass conduit 3 from the conduit 1d connecting the auxiliary heat exchanger 2 to the absorption conduits 1b downstream of system 1 all associated with FIGURE 1a and which bypass conduit may be used to supply low pressure steam to the steam generator feedwater heating cycle and plant auxiliary drives. The enthalpy rise in the auxiliary heat exchanger 2 maximizes steam dryness or provides superheat as the pressure in line 3 is reduced by valve means (not shown).

Figure 2A:
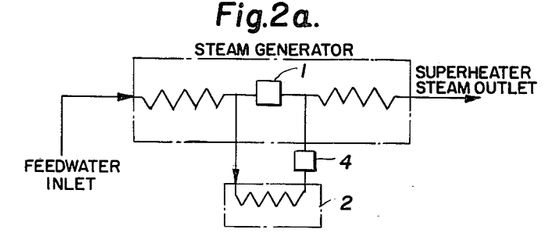
FIGS. 2a, 2b and 2c show the same auxiliary heat exchanger with a shut-off and/or pressure control valve system located at the discharge of the auxiliary heat exchanger.

FIGURE 2a is similar to FIGURE 1a except that shutoff and/or pressure controlling valve system 4 is located in the effluent conduit 1d from the auxiliary heat exchanger 2. When system 1 is closed, the fluid pressure reduction through system 4 will permit the downstream circuit 1b to be operated at a lower pressure than the upstream circuit 1a. Systems 1 and 4 may be used jointly to control downstream pressure. Low pressure operation of the superheater is advantageous during startup since, for any given superheater outlet metal temperature, the enthalpy of the outlet steam will be increased as pressure is decreased. This in turn maximizes steam temperatures in the inlet portions of a connected steam turbine driver after steam admission throttling for lowstartup flows. Thus the steam temperature control range in the turbine driver is increased when raising metal temperature after cooling or matching steam and hot metal temperatures after tripout in accordance with safe operating practice. Functions of system 4 are similar to those of system 1. In the case of system 4, low pressure drop through the open system is not as important as it is in the case of system 1.

After shut down, systems 1 and 4 may be closed, isolating the downstream circuit 1b from the upstream circuit 1a of the steam generator. Pressure in the downstream circuits may be permitted to decay by drawing fluid off through vent or drain lines so that pressures will fall below the critical level. This, in turn, lowers the saturation temperature and will reduce condensate formation in the downstream circuits as the unit cools down. Thus, during start-up, the need for flooding the downstream circuit 1b with fluid from the upstream circuits 1a is eliminated when pressurizing the upstream circuits above the critical pressure level. Volumetric displacements and temperature changes in the steam generator during start-up are minimized.

Figure 2B:
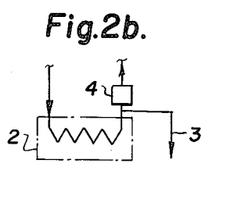
Figure 2C:
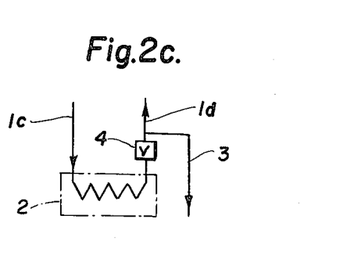

FIGS. 2b and 2c show alternate locations for the bypass conduit 3 at the outlet of the auxiliary heat exchanger 2 associated with FIG. 2a, which may be used to supply low pressure steam to the steam generator feedwater heating cycle and plant auxiliary drives similar to that described for FIG. 1b above.

The auxiliary heat exchanger 2 may be be constructed in conjunction with a combustion type furnace. Since this unit would not be fired during normal operation, and since its total operating hours when fired would be very low, its construction can be greatly simplified. Pumping power is not a significant economic factor. Therefore, to achieve a wide range of flow stability, the pressure drop through the fluid circuits can be relatively large, using high velocity for maximum flows. The heat transfer efficiency can be increased by limiting heat transfer mainly to radiant surface, and operating with high temperature differentials between the gas and fluid. Metal creep factors are not as significant in this unit as they are in the main unit. Heat in the high temperature exit gas from the auxiliary heat exchanger furnace could be partially recovered by introduction of this gas into the main gas path of the steam generator. Counterflow principles could be used for the gas and fluid circuits.

Figure 3:
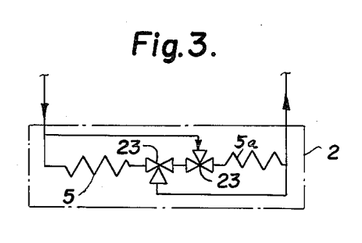
FIG. 3 shows an arrangement of flow through the auxiliary heat exchanger.

In order to increase the operating fluid flow range of the auxiliary heat exchanger 2, the circuits 5 and 5a could be operated in parallel or in series as shown in FIG. 3 by the use of proper valving. Valves 23 are three way valves, but could be replaced by other known standard type valving. The number of parallel circuits could be increased above the two shown in FIG. 3.

In all of the above described systems, there may be one or more parallel circuits in the various flow systems for the steam generator. Components 1, 2, 3 and 4 may also be installed in parallel arrangements. The unit or parallel arrangements may be limited individually to each of the items concerned. The same intent also applies to additional features described below.

Figure 4:
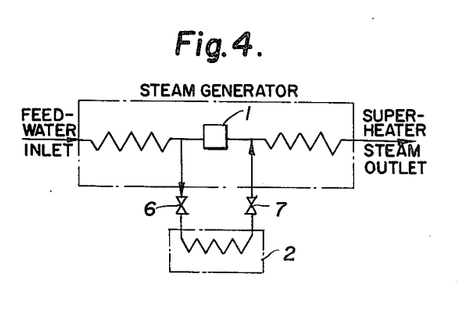
FIG. 4 shows an arrangement of isolation valves in conjunction with the auxiliary heat exchanger.

FIG. 4 shows how isolation valves 6 and 7 may be installed in the fluid supply and discharge conduit lines to the auxiliary heat exchanger 2. The function of these valves is to isolate the auxiliary heat exchanger 2 from the steam generator water-steam flow circuits receiving heat from the main heat source.

Valve locations between the upstream and downstream water-steam circuits 1a and 1b and the auxiliary heat exchanger unit may be arranged to suit the specific application in question, providing they do not obstruct flow from the feedwater inlet to the steam outlet of the steam generator when flow is through system 1. For example, valve 7 may be placed in the conduit 1d between auxiliary heat exchanger 2 and system 4, or, alternatively, in the conduit 1d at the discharge of system 4. Valves 6 and 7 may be used independently of each other.

Figure 5:
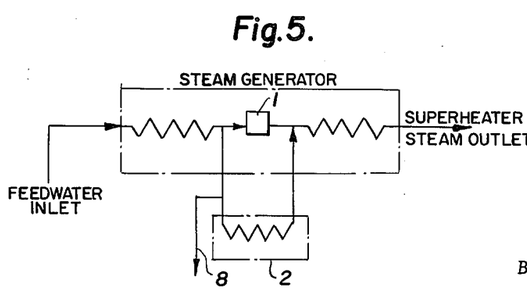
FIGS. 5 and 5b show various locations of by-passes from the steam generator water-steam flow circuit in conjunction with the auxiliary heat exchanger.
Figure 5B:
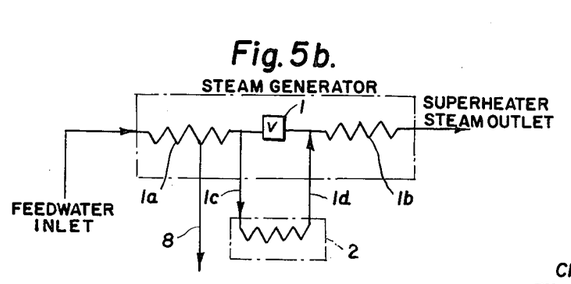

FIGS. 5a and 5b show schematically how various by-pass flow conduits 8 may be arranged in conjunction with the water-steam flow path of the steam generator and auxiliary heat exchanger 2.

Figure 6A:
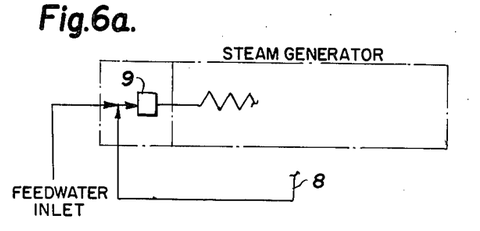
FIGS. 6a, 6b and 6c show how the by-pass systems in FIG. 5 may be used to recirculate flow to the inlet water-steam circuits of the steam generator.
Figure 6B:
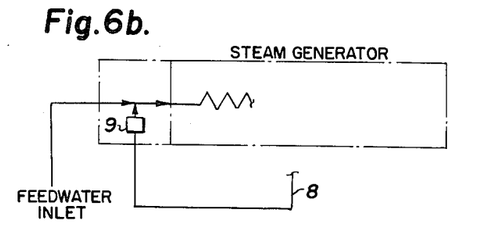
Figure 6C:
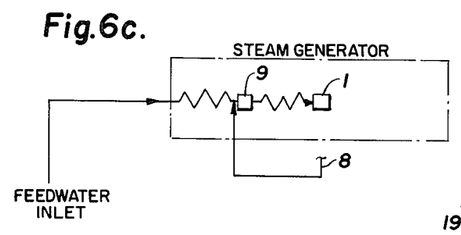

FIGS. 6a, 6b and 6c show how the by-pass flow conduit 8 may be used to recirculate flow directly back to the inlet of the steam generator by use of pump 9. In FIG. 6a, pump 9 raises the pressure of the fluid at the pump discharge entering the steam generator flow circuits above that of the feedwater inlet pressure, thus providing hydraulic head sufficient to overcome the pressure drop between the steam generator flow conduits at the pump discharge and the point where the recirculated bypass flow conduit 8 mixes with the feedwater inlet flow to the steam generator conduits upstream of pump 9. In FIG. 6b, the recirculation pump is located in by-pass conduit 8 before it mixes with the feedwater inlet flow. The pump 9 discharge conduit could connect to the steam generator through flow conduit downstream of heat absorption conduits after the feedwater inlet. In FIG. 6c, the arrangement is similar to that for 6a except that heat exchanger surface is located on the upstream side of the booster or recirculation pump 9. The bypass conduit 8 could also connect to the feedwater inlet conduit before heat absorption conduits using the same pump location as shown. FIGS. 6a, 6b and 6c supplement this invention and are for reference purposes only. The features associated therewith are not a part of this invention nor is this invention dependent upon such features. The features described in said figures are partially covered by Great Britain patent to Sulzer Freres, 831,175, March 23, 1960, 122/C–1 and are known to be in the process of commercial manufacture by others.

Figure 7A:
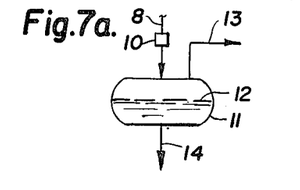
FIGS. 7a, 7b and 7c show how the by-pass system of FIG. 5 may be used to discharge flow to a steam and water separator, or alternately to a feedwater receiver, or to both in series.

FIG. 7a shows how flow in by-pass conduit 8 in FIG. 5 may be discharged to steam and water separator 11 through pressure control valve system 10 reducing the pressure of the fluid entering steam and water separator 11. The steam and water separator water level 12 is controlled through the water drain conduit 14 having flow control valve means (not shown). Separated steam may be drawn off through conduit 13. This steam may be used in the steam generator feedwater heating cycle or may be wasted to a heat sump.

Figure 7B:
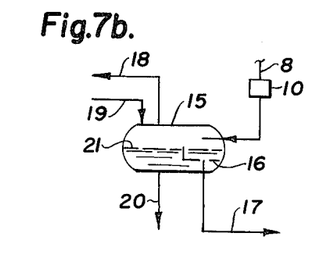

FIG. 7b shows how FIG. 5 by-pass conduit 8 flow may be discharged to a feedwater receiver vessel 15 after pressure reduction through valve system 10. By-pass line 8 may be used to remove contamination from the upstream water-steam circuit of the steam generator during start-up. It is desirable to concentrate the contamination in the by-pass flow and dispose of it so that it will not return to the feedwater inlet connection of the steam generator. The compartmented arrangement formed by baffle 16 in the feedwater receiver 15 accomplishes the desired separation and segregation. The by-pass flow through line 8 entering receiver 15 flashes steam as a result of the pressure reduction through valve system 10. Line 8 flow is confined to the maximum practical extent to the volume immediately above baffle 16. Flow may be broken up by means of spray holes in conduit 8 as it enters receiver 15. The flashed steam may be drawn off through conduit 18 for heating or deaerating feedwater cycle flow to the steam generator. Baffle 16 extends above the water level and envelops a portion of the volume in vessel 15 below the water level forming a separate compartment for liquid containment. Water level 21 in the two compartments of the feedwater receiver 15 is equalized by means of cross-connections on the steam and water sides of baffle 16, conduit 17 will draw water preferentially from the compartment which is fed from conduit 8 as water level rises in the said compartment compared above the water level in the remainder of the receiver 15. When the flow through 17 is greater than the flow through 8, water will also be drawing into 17 from receiver 15 from the compartment being fed by conduit 19. Conduit 19 adds feedwater to the feedwater receiver. Conduit 20 supplies feedwater to the steam generator feedwater inlet. Flow through line 19 is controlled by valve (not shown) to maintain water level 21 approximately constant. Thus all of the flow entering receiver 15 through conduit 8 will either flash as steam and be drawn out through conduit 18 or be collected as water in the compartment formed on the upper side of baffle 16. The contamination in conduit 8 flow remains with the water and flows out conduit 17 along with some additional flow entering receiver 15 through conduit 19.

Figure 7C:
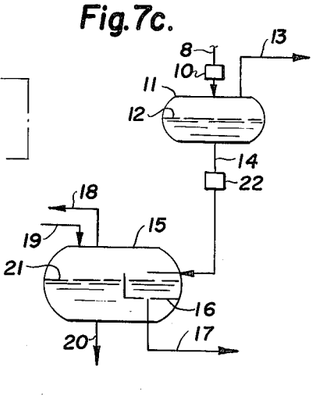

FIG. 7c shows a series arrangement using both steam and water separator 11 and feedwater receiver 15. Flow from steam and water separator 11 through conduit 14 is controlled by valve system 22. Operating the feedwater receiver 15 at a lower pressure than steam and water separator 11 conserves heat by increasing the quantity of flashed steam as a result of further pressure reduction. Concentrations of impurities in conduit 8 are contained to the maximum extent in conduit 17 where they may be discharged to a heat sump for temperature reduction and subsequent purification before return to the steam generator feedwater inlet. Thus when cleaning up the steam generator flow circuits, cycle heat loss is reduced.

In the above descriptions, pressure controlling and/or shut-off valve system 1 in the through circuit between the feedwater inlet and superheater outlet of the steam generator in parallel flow circuits may be also used to control flows in the individual parallel circuits to balance absorption between or among circuits or to regulate or balance superheater intermediate or outlet steam enthalpies, pressures, or temperatures as required where this can be done by regulation of flow between or among circuits.

System 1 can also be used to control the flow of steam to a downstream turbine driver so as to regulate the power output of the turbine driver.

System 1 in conjunction with system 4 can be used to blow out the superheater and downstream piping to a turbine driver and subsequently a reheater with low subcritical pressure steam after construction or maintenance work while operating the inlet water circuits of the steam generator in the normal operating pressure range. Temporary low pressure turbine bypass circuits would be provided (not shown).

Figure 8:
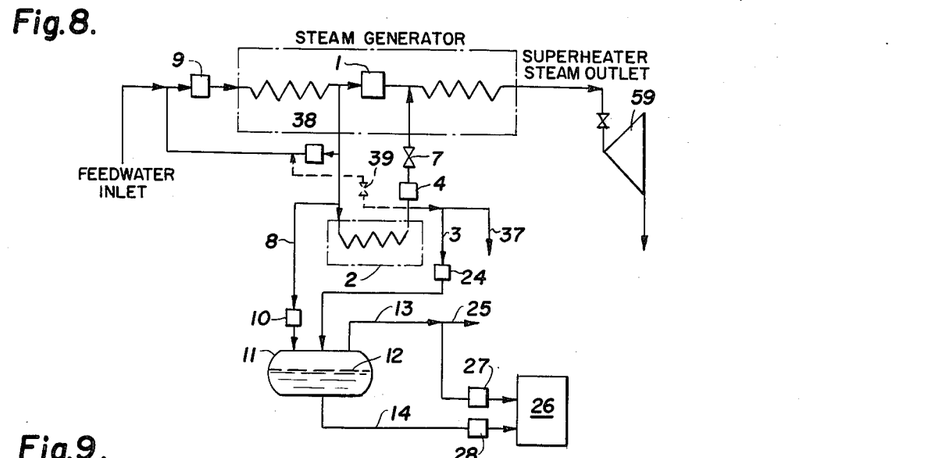
FIG. 8 shows one combination of components illustrated in FIGS. 1 through 7 inclusive, wherein a steam and water separator, only, is associated with the feedwater heating system.

FIG. 8 shows a composite arrangement of a supercritical pressure steam generator system using several components described above and is one of many possible combination arrangements. Feedwater flow entering the steam generator is mixed with recirculation flow passing through 38 and drawn off of the water-steam through flow circuit upstream of pressure controlling and/or shut-off valve system 1 and the combined flow passes through circulator-booster pump 9 before entering the steam generator water-steam flow circuits.

During normal operation system 1 is open. A small amount of flow may be passed through the auxiliary heat exchanger 2 through conduit 37 or through conduit 3 to steam and water separator 11 or through valve 39 to a point downstream of pressure drop device 38 as an orifice or valve in the recirculation line to the steam generator water inlet to keep the auxiliary heat exchanger unit in a warm standby condition ready for instant use. Other means of recirculating flow through exchanger 2 may also be employed eliminating device 38.

During start-up, the water-steam circuit of the steam generator upstream of system 1 may be operated at supercritical pressure while the water-steam through circuit downstream of system 1 may be operated at subcritical pressure. System 1 is closed. Heat absorbed in the upstream circuits can be dissipated in fluid flow through conduit 8, through pressure control valve system 10 to steam and water separator 11. Flow and heat entering the separator 11 can be dissipated in the form of water drains through conduit 14 to heat sump 26 or as steam at subcritical pressure through conduit 13 through control valve system 27 to heat sump 26. Separator 11 steam flow through conduit 13 can be supplied to the feedwater heating system through conduit 25. Level 12 in the separator 11 is regulated by valve controller 28. Thus heat can be added to the steam generator water-steam absorption circuits upstream of system 1 and some of the same heat can be dissipated through the separator 11 system to heat sump 26 or can be used in the feedwater heating system. Heat input to the circuits upstream of system 1 will also parallelly raise the enthalpy of fluid flow in the through circuits downstream of system 1, as both heat inputs are interdependent and are from the same source.

The heat input to the steam generator during startup is sufficiently low so as not to damage the metals in the water-steam through circuits downstream of system 1.

When removing fluid impurities in the steam generator inlet water-steam circuits, the temperature of the flow through line 8 to separator 11 can be maintained at a level which will minimize deposit formations on the through circuit tube walls. The fluid contamination entering the separator 11 through conduit 8 will be concentrated in the separator 11 drains through conduit 14 which discharge to heat sump 26. The fluid here is reduced in temperature so that it may be passed through water purification equipment (not shown) before return to the steam generator feedwater inlet (not shown).

Since the fluid entering auxiliary heat exchanger 2 is substantially below saturation steam enthalpy at subcritical pressures, it is necessary to add heat to the flow passing through the auxiliary heat exchanger 2 so that the outlet enthalpy will approach or exceed the steam saturation enthalpy at the reduced discharge pressure maintained by pressure control valve system 4.

Temperature of the superheater outlet steam can be regulated by the heat input to the heat absorption through circuits downstream of system 1. Surplus heat from the main heat source in the through circuits upstream of system 1 can be dissipated in heat sump 26 through the separator 11 system. Pressure of the superheater outlet steam can be controlled by valve systems 4 and 1, gradually raising pressure during startup from low subcritical pressure to the normal operating supercritical pressure range. As the pressure downstream of system 1 increases to the supercritical pressure range, system 1 may be controlled to the fully open position and flow through the auxiliary heat exchanger 2 may be discontinued.

Initially, the auxiliary heat exchanger 2 through 3, 24, 11, 13, and 25 also provides a source of auxiliary steam for use in the feedwater heating cycle. Throttling valve system 24 controls flow to separator 11.

On a sudden interruption of superheated outlet steam flow requiring discontinuance of heat input from the main heat source, flow may be diverted through the auxiliary heat exchanger 2, quickly turning on the auxiliary heat source. Adding heat in the auxiliary heat exchanger 2 will facilitate a source of steam supply to the feedwater heating cycle and auxiliary turbine drives such as a feedwater pump turbine drive (not shown). Such turbine driven boiler feed pump can continue in operation after a trip out of the main heat source, maintaining pressure in the steam generator circuits with minimum deterioration of the heat level. Also by closing system 1 and reducing pressure in the circuits downstream of system 1, by throttling system 4, steam temperatures inside a turbine driver 59 receiving steam from the superheater outlet may be maximized when restarting the unit. After a trip out, excessive pressure in the steam generator water-steam flow circuits may be relieved by flow through a conduit 8 and control valve system 10.

Where it is desired to continue operating the steam generator after loss of superheater outlet steam flow as a result of turbine driver 59 tripping, the heat input to the steam generator absorption circuits is reduced to the minimum level which will assure stable firing conditions. Surplus heat in the circuits upstream of system 1 may be dissipated in the form of flow through conduit 8 and control valve system 10 to separator 11 and from thence to heat sump 26. Cooling flow may be maintained in the steam generator water-steam circuits downstream of system 1 by means of safety valves (not shown) at the superheater steam outlet connection or through alternate drain or blow off valves (not shown) to atmosphere or to heat sump 26.

After the steam generator has been stopped during the course of a scheduled outage and it is desired to restart the unit hot after a period of time, system 1 and system 4 or valve 7 as a substitute for system 4 may be closed. Fluid in the steam generator circuits downstream of system 1 may be controlled through leakoff (not shown) so as to permit pressure to fall to a subcritical level. Pressure in the through circuits upstream of system 1 may be maintained in the supercritical pressure range during shutdown by recirculating flow through pump 9 and allowing part of the flow to pass through auxiliary heat exchanger 2 adding heat to this flow, returning the effluent from auxiliary heat exchanger 2 through valve 39 to the recirculating system mixing with and warming the flow to the suction of pump 9. Adding heat to the recirculation loop upstream of system 1 will prevent pressure decrease below the critical value without having to fire the steam generator main furnace. In order to establish the necessary pressure differential for flow through auxiliary heat exchanger 2, pressure drop device 38 is shown in the recirculation circuit. Other possible pressure differential arrangements are not shown.

Figure 9:
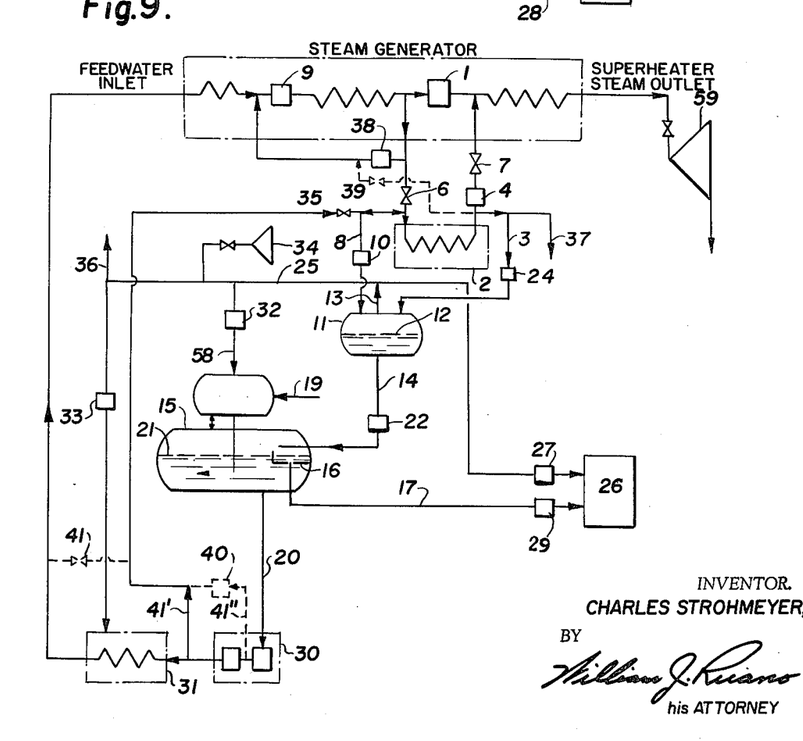
FIG. 9 shows another possible arrangement, using components illustrated in FIGS. 1 through 7 inclusive, wherein both a steam and water separator and feedwater receiver are associated with the feedwater heating system.

FIG. 9 shows a composite arrangement of a supercritical pressure steam generator system using several components described above and which is similar to FIG. 8 above. Only those new features are described below.

Steam and water separator 11 discharges through drain conduit 14 to feedwater receiver 15, similar to that described in FIGS. 7b and 7c. Valve system 29 controls flow through conduit 17 to heat sump 26. Valve system 22 controls flow through conduit 14 from separator 11 to feedwater receiver 15. The steam supply conduit 25 from separator 11 to the feedwater heating system has been elaborated. Conduit 25 is shown supplying steam to deaerator 58 through flow control valve 32 regulating downstream pressure, and supplying steam to the high pressure feedwater heaters 31 through flow control valve 33. Steam from conduit 25 may be supplied to auxiliary turbine driver 34 and conduit 36 for use elsewhere in the plant. Driver 34 could power boiler feed pump system 30.

Feedwater supply to the deaerator 58 enters through conduit 19. Deaerator 58 effluent flows by gravity to receiver 15, through conduit 60 then through conduit 20 to the boiler feed pump system 30 and discharges through high pressure heater system 31 on the way to the steam generator feedwater inlet.

When it is desired to pressurize the steam generator water-steam recirculation loop upstream of system 1 before starting pump 9 and lighting off the main furnace fires and the boiler feed pump 30 is driven wholly or in significant part by a steam turbine driver normally receiving steam from the steam generator circuits or connecting downstream main turbine 59 extraction steam system through conduit 61, a source of steam independent of the steam generator is required for the boiler feed pump steam turbine drive. The auxiliary heat exchanger 2 may be this source. It can be fired independently and can be isolated from the steam generator water-steam through circuit by valves 6 and 7. Water may be circulated from an interstage conduit 41'' of boiler feed pump 30 or from the pump 30 discharge through conduits 41 or 41' through shutoff valve 35 to the inlet of auxiliary heat exchanger 2. Valve system 40 is a reverse flow preventer to protect the interstage connections from high pressure. A separate low discharge pressure circulator pump (not shown) as a substitute for the high pressure steam turbine driven boiler feed pump or a motor driven booster pump (not shown) associated with the high pressure steam turbine driven boiler feed pump may take feedwater suction from receiver 15 through conduit 20 and discharge through the feedwater pump system 30 to conduits 41, or 41'' as described above. The heated effluent from auxiliary heat exchanger 2 is discharged to the separator 11 through conduit 3 and pressure control valve 24.

As steam pressure rises in the separator 11 and is drawn off through conduit 25 to supply steam to the boiler feed pump turbine driver 34, the associated pump system 30 will build up speed, fluid discharge flow capability and fluid discharge pressure. Pressure of the fluid in the auxiliary heat exchanger 2 may be maintained above the pressure corresponding to saturation temperature. Pressure reduction in valve system 24 results in part of the discharge flow flashing to steam. As fluid pressure in the auxiliary heat exchanger is increased, as a result of increasing pump 30 speed its heat input capability is increased for any given fluid flow. The gradual increase of steam flow from separator 11 steam to the boiler feed pump turbine driver 34 permits the pump 30 to add fluid to the steam generator water-steam through circuits at supercritical pressure so that pump 9 can be started and the main steam generator furnace fired. Exhaust steam from turbine driver 59 may be condensed and returned to the deaerator through conduit 19 after passing through a low pressure feedwater heating system (not shown).

Figure 10:
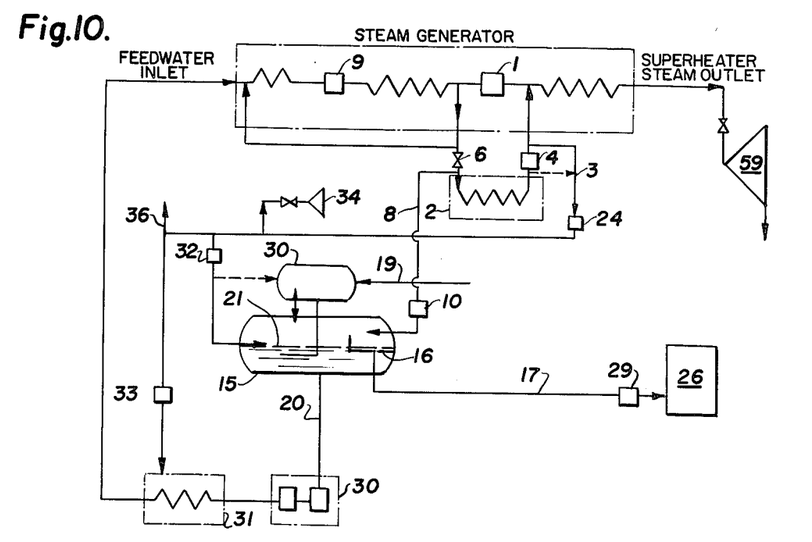
FIG. 10 shows another possible arrangement using the components shown in FIGS. 1 through 7 inclusive, wherein a feedwater receiver only is used in conjunction with the auxiliary heat exchanger.

FIG. 10 shows a composite arrangement of a supercritical pressure steam generator system using several components described above and which is similar to FIG. 8 above. Only those new and different features are described below.

Water receiver 15 replaces steam and water separator 11. Water receiver 15 is the same construction as described for FIG. 7b above. Operation of water receiver 15 in the cycle is similar to that described for FIG. 9 above. Auxiliary steam for the feedwater heating cycle and auxiliary drives is obtained at the discharge of shutoff and/or pressure control valve system 4 and flows through conduit 3 through pressure control valve 24 which regulates downstream pressure. Conduit 3 could be taken from a point upstream of system 4. Also, a steam and water separator not shown could be inserted in conduit 3 at a point where the pressure is subcritical. Auxiliary steam discharging from valve 24 feeds auxiliary driver 34, deaerator 58 through control valve 32 regulating downstream pressure and in receiver 15 in series therewith, high pressure feedwater heating system 31 through control valve 33, regulating downstream pressure, and, other plant services through conduit 36. The receiver and deaerator steam space are connected through conduit 62.

Figure 11:
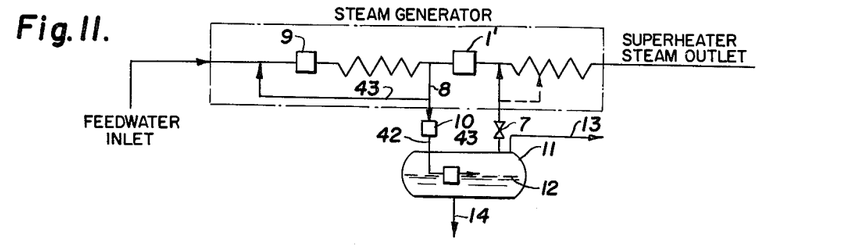
FIG. 11 shows a supercritical pressure steam generator arrangement using a steam and water separator as a means of obtaining low pressure superheater outlet steam for startup.

As a substitute for the auxiliary heat exchanger 2, the arrangement shown in FIG. 11, may be used in a supercritical pressure steam generator where recirculation flow is required in the heat absorption surfaces most intimately exposed to radiant heat.

In FIG. 11 the auxiliary heat exchanger 2 is omitted. Pressure controlling and shutoff valve system 1 separates the feedwater inlet through circuit from the superheater steam outlet circuit. Bypass 8 is taken from an intermediate point in the through circuit and upstream of system 1 and discharges to steam and water separator 11 through pressure control valve system 10, reducing the pressure in the downstream conduit 42 where heated upstream fluid flashes to a mixture of steam and water before entering steam and water separator 11. Conduit 42 may be combined with or be part of the internals of the steam and water containment vessel 11. The flashed flow enters system 43 which is a known mechanical means of separating steam and water such as through centrifugal action, passing flow around or among baffles or through screens or by means of other separating devices. System 43 may be combined with the steam and water separator containment vessel 11.

The separated steam may flow to the superheater or an intermediate portion thereof downstream from valve system 1 through valve system 7 or to the feedwater heating cycle, a heat sump or to waste through conduit 13, as described in FIGS. 7a and 7c.

The separated water may be disposed of through conduit 14 as described above in FIGS. 7a and 7c.

The flow to steam and water separator 11 through system 10 and conduit 42 is only a portion of the total flow discharging through conduit 8 upstream of system 1, and is below the minimum flow required for safe operation of the circuits intimately exposed to radiant heat in the furnace when the furnace is fixed. The ratio of flow through 10 compared with the total flow through conduit 8 may be in the range of 1 to 2 and preferably the flow through 10 would be no greater. The remainder of the conduit 8 flow returns to an upstream point through conduit 43. Pump 9 provides the necessary hydraulic head required for recirculation. Other arrangements of pump 9 are shown on FIGS. 6 and 6c or are described above.

By means of the above system during startup the steam generator through fluid circuits downsteam of system 1 may be operated at a lower pressure than the upstream through circuits all between the feedwater inlet and superheater steam outlet. The upstream circuits may be operated in the supercritical pressure range and the downstream circuits may be operated in the sub-critical pressure range.

In the description of FIGS. 1a, 1b, 1c, 1d, 1e, 2a, 2b, 2c, 3, 4, 5a, 5b, 6a, 6b, 6c, 7a, 7b, 7c, 8, 9 and 10 above it will be seen that the invention comprises a steam-electric generating plant having a steam generator and a supplemental auxiliary heat exchanger. The steam generator and auxiliary heat exchanger each have their own independent source of heat input. During startup when superheating outlet steam flow is low the auxiliary heat exchanger increases the total heat input to the cycle above that received directly from the source of heat input to the steam generator. This permits the inlet portion of the steam generator heat absorption conduits to be operated at a temperature below saturation and at the same time flow relatively dry steam to the superheater for use in a turbine connected to and receiving steam from the superheater outlet. The auxiliary heat exchanger increases the heat level of the fluid entering the superheater at such times as heat is preferentially added to that portion of the flow which is diverted to the superheater.

Where there is substantial recirculation of fluid flow and loss of heat through a bypass system upstream of the auxiliary heat exchanger, the recirculated fluid is initially unsatisfactory for use in the superheater. The firing rate required to compensate for bypass system losses causes high temperature rise in the superheater if the recirculated flow were raised to saturation level. The addition of heat in the auxiliary heat exchanger for the low flow rate passing to the superheater overcomes this difficulty. As the flow rate through the superheater increases, the bypass losses decrease proportionately so that the heat input to the steam generator water-steam circuit throughout its entire length becomes more nearly proportionate to design ratios. Thus, as the flow rate through the superheater increases the auxiliary heat exchanger can be removed from service. It is only used during startup of the unit. Its heating surface is in addition to that required by the steam generator during normal operation.

During startup of the steam generator and turbine consumer at the superheater outlet, flow is circulated in the steam generator circuits upstream of the auxiliary heat exchanger, firing rate is maintained to heat up the steam generator within limits without overheating the superheater, subcooled liquid is passed through the auxiliary heat exchanger to increase the dryness or superheat of the steam passing to the superheater for use in the turbine. As the flow through the superheater is increased, the heat level of the recirculated flow is increased to a point where the recirculated flow may be passed directly to the superheater at which time use of the auxiliary heat exchanger is no longer required.

Valve means 1 and 4 permit the downstream superheater to be operated at a lower pressure than the upstream circuits. Variable pressure operation in the superheater at the time when flow is initially passed through the auxiliary heat exchanger permits enthalpy control of the superheater outlet steam in the manner as described in my copending U.S. patent application S.N. 42,194, filed June 7, 1960. Control of enthalpy permits regulation of steam temperatures within the turbine to suit varied startup conditions or low load operation.

Thus it will be seen that I have provided efficient systems for improving the operating flexibility of steam electric generating units, including reduction of unit start-up time and costs; also I have provided the steam generator with capability to vary superheater outlet steam temperature to control the rate of metal temperature rise or fall within the turbine during start-up and shut-down, respectively, embodying an auxiliary heat exchanger, heated from a separate source, for heating flow in an intermediate section of the water-steam circuit of a steam generator, also for supplying low, subcritical pressure steam to the steam generator feedwater heating cycle or plant auxiliary drives; also I have provided a novel system for extracting water-steam flow upstream of the auxiliary heat exchanger which may be discharged to a receiver operating at lower pressure in the subcritical range for the purpose of auxiliary steam supply.

While I have illustrated and described several embodiments of my invention, it will be understood that these are by way of illustration only, and that various changes and modifications may be made within the contemplation of my invention and within the scope of the following claims.

I claim:

1. A load carrying steam generator for a steam-electric generating plant having a feedwater inlet, a superheater steam outlet, a water-steam heat absorption circuit therebetween, and a heating system for supplying heat input to said steam generator water-steam heat absorption circuit, said feedwater inlet, superheater steam outlet, water-steam heat absorption circuit and heating system forming an integral heat exchanger for normal operation of said plant, a startup auxiliary heat exchanger externally of said first mentioned heat exchanger and isolated from said heating system, a separate heat generation system externally of said first mentioned heat exchanger for supplying heat input to said startup auxiliary heat exchanger and for increasing the enthalpy of the fluid at said superheater outlet, conduit and flow control valve means included in said water-steam heat absorption circuit and connected between said water-steam heat absorption circuit and said auxiliary heat exchanger to selectively flow fluid during startup of said plant from an intermediate portion of said steam generator water-steam heat absorption circuit between said feedwater inlet and superheater outlet, directly through said startup auxiliary heat exchanger to a portion of said steam generator water-steam heat absorption circuit downstream from said intermediate portion and upstream of at least a portion of said water-steam heat absorption circuit which is connected to the superheater steam outlet, said conduit and flow control valve means including valve means for disconnecting said startup auxiliary heat exchanger from said downstream portion as fluid flow in said steam generator water-steam heat absorption circuit is increased above startup requirements.

2. A steam generator as recited in claim 1 said conduit and flow control valve means includes throttling means adapted for operating said downstream portion of said water-steam heat absorption circuit at a substantially lower pressure than the portion of the water-steam heat absorption circuit upstream of said flow control valve means during startup when fluid is flowing through said startup auxiliary heat exchanger.

3. A steam generator as recited in claim 1 together with a regenerative feedwater heating and supply system connected to said steam generator feedwater inlet and additional conduit and flow control valve means at the discharge of said auxiliary heat exchanger to selectively flow fluid discharge from said startup auxiliary heat exchanger to said regenerative feedwater heating and supply system.

4. In a steam-electric generating plant comprising an integral load carrying steam generator having heat absorption conduits interposed between a feedwater inlet and superheater steam outlet, a steam turbine drive, fluid conducting conduit means serially interconnecting said feedwater inlet, said heat absorption conduits, said superheater steam outlet and said steam turbine driver, a heat input source for supplying heat for said steam generator heat absorption conduits, said heat absorption conduits and said heat input source forming an integral heat exchanger for normal operation of said plant, flow control valve means in said heat absorption conduits, conduit means during startup for circulating fluid in at least a portion of said heat absorption conduits which is upstream of said flow control valve means, a startup, auxiliary heat exchanger externally of said first mentioned heat exchanger and isolated from said heat input source for increasing heat input to said steam generator fluid flow during startup, additional conduit and flow control means between said heat absorption circuits and auxiliary heat exchanger for drawing off and conveying a fractional portion of said circulating fluid in said steam generator upstream heat absorption conduits directly through said auxiliary heat exchanger to at least a portion of said steam generator heat absorption conduits downstream of said flow control valve means, and a separate source of heat generation and input for said startup auxiliary heat exchanger externally of said first mentioned heat exchanger; the method of starting said steam generator and turbine driver when fluid receiving heat from said first heat input source is circulating in said steam generator upstream portion of said heat absorption conduits and a fractional portion of said circulating fluid is drawn off and passed directly through said auxiliary heat exchanger to said steam generator downstream portion of said heat absorption conduits and when said circulating fluid in said upstream portion of said steam generator heat absorption conduits is substantially below saturation steam enthalpy, said method comprising applying said separate source of heat generation and input to the fluid flowing through said auxiliary heat exchanger to increase the enthalpy of said fractional portion of said circulating fluid, thereby increasing the dryness of the fluid in said steam generator downstream portion of said heat absorption conduits, said separate source of heat generation and input supplementing said first heat input before and immediately after the time when fluid is discharged from said superheater steam outlet to said steam turbine driver, and by-passing said auxiliary heat exchanger by flowing fluid directly through said first control valve means as fluid flow to said steam turbine driver is substantially increased, and thereafter discontinuing flow from said auxiliary heat exchanger to said superheater outlet.

5. The method recited in claim 4 together with operating said additional conduit and flow control means to throttle flow so that said downstream portion of said steam generator heat absorption conduits is at a pressure substantially below the pressure in said upstream portion of said steam generator heat absorption conduits when flow is first passed through said auxiliary heat exchanger to said downstream portion of said steam generator heat absorption conduits.

References Cited by the Examiner

UNITED STATES PATENTS

| | | | |
|---|---|---|---|
| 2,907,305 | 10/59 | Profos. | |
| 2,989,038 | 6/61 | Schwarz | 122—406 |
| 3,003,479 | 10/61 | Bock et al. | 122—406 |

FOREIGN PATENTS 716,524  10/54  Great Britain.

OTHER REFERENCES

German Printed Application No. 1,109,705, printed June 29, 1961.

FREDERICK MATTESON, Jr., *Primary Examiner.*

KENNETH W. SPRAGUE, PERCY L. PATRICK,
*Examiners.*